United States Patent [19]

Kaido et al.

[11] Patent Number: 4,847,166
[45] Date of Patent: Jul. 11, 1989

[54] SLIDE PARTS

[75] Inventors: Masataka Kaido; Yoshio Fuwa, both of Aichi, Japan

[73] Assignee: Toyota Jidosha Kabushiki Kaisha, Japan

[21] Appl. No.: 124,985

[22] Filed: Nov. 24, 1987

[30] Foreign Application Priority Data

Nov. 25, 1986 [JP] Japan ................................ 61-280017

[51] Int. Cl.⁴ ............................................. F16K 25/00
[52] U.S. Cl. .................... 428/591; 428/629; 428/653; 428/681; 251/368; 137/375
[58] Field of Search ............... 428/591, 615, 629, 653, 428/654, 681; 137/375; 251/368

[56] References Cited

FOREIGN PATENT DOCUMENTS 58-146763 of 1983 Japan .
60-165389 of 1985 Japan .

OTHER PUBLICATIONS

Handbook for Metal Plating, Daily Industrial Newspaper Co., 1st Ed., Jul. 25, 1971, p. 270 (4 Pages).
Machine Planning, vol. 29, No. 15, 1985, pp. 77–86.

*Primary Examiner*—L. Dewayne Rutledge
*Assistant Examiner*—George Wyszomierski
*Attorney, Agent, or Firm*—Finnegan, Henderson, Farabow, Garrett & Dunner

[57] ABSTRACT

Disclosed are slide parts, comprising one part made of an aluminium alloy having an Alumite layer formed on the slide surface thereof and the other part made of an aluminium alloy having a Fe-series wet-plated layer formed on the slide surface thereof, which is to be in contact with and slide on the slide surface of the former alloy part; and a method of the manufacture of the slide parts. The slide parts are lightweight and are excellent in abrasion-resistance and baking-resistance. The clearance variation by temperature is little, and the slide parts are suitable for use as reciprocating slide parts.

5 Claims, 3 Drawing Sheets

SLIDE PARTS

BACKGROUND OF THE INVENTION

1. Field of the Invention

The present invention relates to slide parts, each part having a slide surface and more particularly, it relates to slide parts, both base materials of which are made of an aluminum alloy, and to a method for manufacture of the same.

2. Description of the Prior Art

Slide parts which are used in cars or in other vehicles are designed to be lightweight, and therefore, are required to be made of an aluminum alloy. However, aluminum alloys themselves have a defect in that their abrasion-resistance is poor for use in slide parts. In order to overcome this defect, a method of forming an Alumite film layer on the surface of the base metal by anodic oxidation has been described (Machine Planning, Vol. 29, No. 15, pp. 77–86, 1985). This Alumite film layer is effective in improving the abrasion-resistance of the base metal, even though the metal is an aluminum alloy.

It is apparent, that, if both parts of a pair of slide parts are coated with the Alumite film, the abrasion tends to become greater when the parts slide on each other. It has been proven that the abrasion is decreased in the case of a pair of slide parts comprising a part with an Alumite layer, and a part made of steel. Previously, lightweight slide parts have been used comprising an aluminum alloy with an Alumite layer formed thereon by an anodic oxidation treatment as a body side-part and a steel with a high abrasion-resistance or a heat-treated steel as a valve side-part.

However, when the said slide parts are used in a reciprocating system, problems arise, as mentioned below, which result from the variation in the temperature of the lubricants used.

Particularly, since the body side-part (aluminum alloy+Alumite layer) and the valve side part (iron series material) differ in thermal expansion coefficients, the clearance in the slide parts becomes insufficient at low temperatures, which causes sticking (valve slide clearance insufficiency), while the clearance becomes greater at higher temperature, which causes oil leakage. This has been one problem. Further, when the slide parts are used at a high temperature, and then cooled, extraneous substances in the lubricant circuit remain between the valve and the body, which also causes sticking. This has been another problem.

In order to solve these problems, it has been known as a matter of course to use the parts having similar linear expansion coefficients as much as possible in both the body side and the valve side. Therefore, it has been proposed to use an Alumite coated aluminum alloy also at the valve side, and this has already been partly put into practical use. Although the above combination prevents the above-mentioned drawbacks caused by the clearance variations or the like, the problem that the abrasion-resistance is still poor remains, as the Alumite layers are subjected to sliding upon each other.

For the improvement of the abrasion-resistance of aluminum or the like, the following methods are known beside the abovementioned anodic oxidation treatment (Alumite coating treatment).

(1) A method of hardening of the surface by Fe plating. (Refer to Handbook for Metal Plating. Daily Industrial Newspaper Co., 1st Edt., July 25, 1971, page 20)

(2) A method of polishing one aluminum alloy by electrolytic polishing and forming a layer on an aluminum alloy by Fe-P (iron-phosphorus alloy) plating (cf. Japanese Patent Laid-Open Sho No. 58-146763).

(3) A method of etching treatment (hereinafter referred to as "ECM treatment") by electrolytic polishing or chemical polishing on one aluminum alloy and forming a layer containing dispersed particles of SiC (silicon carbide) on the corresponding slide part of aluminum alloy by Fe-P plating (cf. Japanese Patent Laid-Open Sho No. 60-165389).

While these methods have shown some improvements, they are not at all satisfactory. For example, when a high silicon-aluminum alloy (AA Standard: A 390) having a high abrasion-resistance among aluminum alloys is used, the abrasion of other part of Fe-plated material is increased to augment the surface roughness thereof because friction is generated between the primary crystal silicon (Hv 900 to 1100) in the aluminum alloy structure and the other part, whereby both the aluminum alloy itself and the part are noticeably abraded. In addition, when used in the region of high load, the primary crystal silicon cracks or peels off to cause the same phenomenon as in the case of the presence of extraneous substances, whereby the value of baking load is lowered.

Accordingly, the present invention has been so made as to solve the above-mentioned problems, and an object thereof is to provide slide parts, the base metals of which are made of an aluminum alloy, and which are free from clearance variation even under temperature variations and excellent in abrasion-resistance and baking-resistance.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

SUMMARY OF THE INVENTION

To achieve the objects and in accordance with the purpose of the invention, as embodied and broadly described therein, the slide parts of the present invention each have a slide surface and comprise a part of an aluminum alloy having an Alumite layer formed on the slide surface and another part of aluminum alloy having an Fe-series wet-plated layer formed on the slide surface thereof the slide surfaces designed to be in mutual contact for relative sliding movement. The slide parts of this kind can be manufactured by treating the slide surface of one aluminum alloy with an anodic oxidation treatment and by applying Fe-series wet-plating to the slide surface of the other aluminum alloy which is to be in contact with the first slide part.

The accompanying drawings, which are incorporated in and constitute a part of this specification, illustrate embodiments of the invention and, together with the description, serve to explain the principles of the invention.

DETAILED DESCRIPTION OF THE INVENTION

Figure 1:
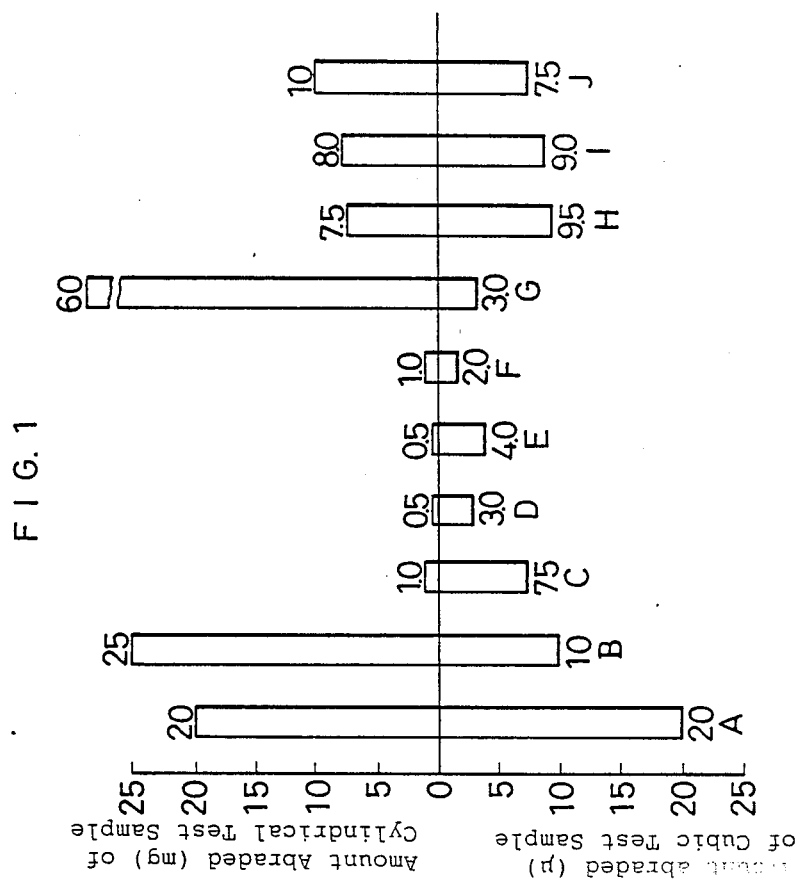
FIG. 1 is a graph showing the results of the abrasion-resistance testing of the slide parts of the present invention in comparison with those of the slide parts of comparative examples.

The Alumite coated part of the slide part can be obtained in a conventional manner, by an anodic oxidation treatment of an aluminum alloy capable of forming an Alumite layer in the anode of electrolytic bath, for example, a sulfuric acid bath, an oxalic acid bath, or a mixed acid bath with the former two. The hardness of the Alumite layer may be Hv 150 or more. If lower than the said hardness limitation, the abrasion of the Alumite layer increase remarkably.

As to the wet-plated Fe-series layer to be formed on the other part, a layer comprising Fe-plate, Fe-0.2–15% P-plate or SiC grain dispersed Fe-plate is preferred, which is explained hereinafter.

The formation of the iron-plate layer can be performed by conventional methods using a known ferrous sulfate bath, ferrous chloride bath, mixed bath of the former two, ferrous sulfamate bath, or the like.

The formation of the SiC grain-dispersed iron-plate layer can be performed by treatment with a conventional iron-plating solution into which SiC grains are dispersed. The grain size of said SiC grains is preferably from 0.1 to 10$\mu$. If the size is less than 0.1$\mu$, the effect of the improvement of abrasion-resistance and baking-resistance would be insufficient. On the other hand, if the size is more than 10$\mu$, the aggressiveness to the other part would become too large. The amount of SiC grains to be dispersed in the Fe-plate base layer is preferably from 5 to 35% by volume. If the amount is less than 5%, abrasion can not be reduced, and if the amount is more than 35%, the aggressiveness to the other part becomes outstanding.

The formation of the Fe-0.2–15% P-plate layer can be performed by plating in a plating bath which comprises main components of from 100 to 350 g/liter of iron chloride ($FeCl_2 4H_2O$) and from 5 to 25 g/liter of sodium hypophosphite, said bath being adjusted to have a pH value of from 0.1 to 1.2 with hydrochloric acid.

The phosphorus content of the Fe-P alloy plate layer is restricted to the range of from 0.2 to 15%, which is because, if the content is less than 0.2%, the effect of the improvement of the abrasion-resistance and the baking-resistance would be insufficient; and, if the content is more than 15% the plate layer would be so brittle as to cause the cracking of the layer.

The film thickness of the above mentioned plate layers is not specifically limitative, but may be, in general, from 1 to 150$\mu$.

In the slide parts of the present invention, the thermal expansion coefficient difference between the aluminum alloys of both base metals is preferably $3 \times 10^{-6}/°$ C. or less. If said difference is more than said limitations, the extraneous materials in the lubricant circuit remain between the body and the valve, which often causes sticking when the parts are used at high temperatures (150° C.) and then cooled. On the contrary, when the difference is $3 \times 10^{-6}/°$ C. or less, the resistance of the extraneous materials would only cause some scratches between the body and the valve without any sticking.

Accordingly, the slide parts of the present invention are suitable as reciprocating slide parts, for example, with a valve chamber for an oil switching device of an automatic transmission and a shift valve which engages slidably with the valve chamber.

EMBODIMENT

The present invention is explained hereinafter by reference to embodiments in comparison with comparative examples (hereinafter referred to "examples") which, however are not intended to limit the scope of the present invention.

Embodiment 1:

Using an aluminum alloy (JIS, ADC 12), a cylinder having an outer diameter of 35 mm, an inner diameter of 30 mm, and length of 10 mm was manufactured; and then the outer surface thereof was subjected to anodic oxidation in a sulfuric acid bath. Thus, a cylindrical test sample with an oxide film (Alumite film) having a thickness of 10$\mu$ and a hardness of Hv 300 was obtained.

On the other hand, an aluminum alloy casting (JIS, AC 1A) having a size of $16 \times 6 \times 10$ mm was plated in a sulfate bath (ferrous sulfate, 250 g/liter) under the condition of electric current density of 5 A/dm$^2$ and a bath temperature of 60° C., to obtain a cubic test sample having an Fe-plate layer with a thickness of 25$\mu$ and a hardness of Hv 300 (test surface size $16 \times 6$ mm).

The said cubic test sample and the above mentioned cylindrical test sample were combined and used in the abrasion-resistance test as mentioned below.

Embodiment 2:

The same test combination comprising the same test samples as those in Embodiment 1 was prepared except that the Fe-plate layer in the cubic test sample in Embodiment 1 was replaced by a Fe-1% P-plate layer (thickness: 30$\mu$m, hardness: Hv 500); and this was subjected to the same test.

The formation of the Fe-1% P-plate layer on the aluminum alloy base was carried out in a plating bath comprising 260 g/liter ammonium sulfate, 1.0 g/liter of phosphorous acid, 110 g/liter of ammonium sulfate and 26 g/liter of boric acid under the condition of a pH of 3, a bath temperature of 62° C. and electric current density of 5 A/dm$^2$.

Embodiment 3:

The same test combination as in Embodiment 1 was prepared except that the Fe-plate layer of the cubic test sample was replaced by a SiC grains-dispersed Fe-plate layer, and this was subjeced to the test as mentioned below.

The formation of the SiC grains-dispersed iron-plate layer was carried out in a plating solution comprising SiC grains having a grain diameter of 1.5$\mu$ dispersed in the sulfate bath (ferrous sulfate, 250 g/liter) in an amount of 30 g/liter under the condition of an electric current density of 7 A/dm$^2$ and a bath temperature of 60° C. The thickness of the layer thus formed was 25$\mu$, the hardness thereof was Hv 800 and the content of SiC was 10% by volume.

EXAMPLES 1 to 7:

Various examples were prepared for a comparative test of the embodiments of the present invention, which comprise cylindrical test samples on the one hand and cubic test samples on the other hand as shown in Table 1, in which the embodiments of the present invention are also shown. Those examples 1 to 7 were prepared in the same manner of preparation of Embodiments 1 to 3. The ECM treatments were carried out in accordance with the above mentioned Japanese Patent Laid-Open Sho Nos. 58-146763 and Sho No. 60-165389.

TABLE 1

| No. | Combination Code | Cylindrical Test Sample | | Cubic Test Sample | |
|---|---|---|---|---|---|
| | | Base metal | Surface | Base metal | Surface |
| Example | | | | | |
| 1 | A | aluminum alloy (ADC12) | Alumite (10μ, Hv 300) | forged aluminum (A 6063) | none |
| 2 | B | aluminum alloy (ADC12) | Alumite (10μ, Hv) 300) | forged aluminum (A 6063) | Alumite (25μ, Hv 400) |
| 3 | C | aluminum alloy (ADC12) | Alumite (10μ, Hv 300) | steel (S 45 C) | quenched (Hv 550) |
| Embodiment | | | | | |
| 1 | D | aluminum alloy (ADC12) | Alumite (10μ, Hv 300) | aluminum casting (AC 1A) | Fe-plate (25μ, Hv 300) |
| 2 | E | aluminum alloy (ADC12) | Alumite (10μ, Hv 300) | aluminum casting (AC 1A) | Fe-plate (30μ, Hv 500) |
| 3 | F | aluminum alloy (ADC12) | Alumite (10μ, Hv 300) | aluminum casting (AC 1A) | SiC-dispersed Fe-plate (25μ, Hv 800) |
| Example | | | | | |
| 4 | G | aluminum alloy (ADC12) | none | aluminum casting (AC 1A) | Fe-plate (25μ, Hv 300) |
| 5 | H | aluminum alloy (A 390) | ECM treatment | aluminum casting (AC 1A) | Fe-plate (23μ, Hv 300) |
| 6 | I | aluminum alloy (A 390) | ECM treatment | aluminum casting (AC 1A) | Fe-P-Plate (30μ Hv 500) |
| 7 | J | aluminum alloy (A 390) | ECM treatment | aluminum casting (AC 1A) | SiC-dispesed Fe-plate (25μ, Hv 800) |

In the above Table 1, the parenthetical contents for the base metal mean the JIS standard, and the parenthesized contents for the surface mean the film thickness and hardness.

Abrasion Test:

Each of Embodiments 1 to 3 and Examples 1 to 7 were set in an abrasion testing machine, where the outer surface of a cylindrical test sample was kept in contact with the 16×6 mm surface of the cubic test sample; these were subjected to a rotary abrasion test for 30 minutes under the condition of a load of 60 kg and a rotation number of 160 rpm, while a lubricant oil (ATF: trade name "Dexron II") having a temperature of 25° C. was applied to the contacted part of the test samples. The surface roughness of the cylindrical test sample and that of the cubic test sample was 0.8 uRz and 1.2 uRz respectively.

The results of the abrasion test are shown in FIG. 1. The upper half of FIG. 1 shows the amount abraded (amount reduced by abrasion: mg) on the cylindrical test sample. The lower half of FIG. 1 shows the amount abraded (depth abraded: μ) on the cubic test sample. The alphabet code in FIG. 1 corresponds to the combination code in Table 1.

From FIG. 1, it is clear that the test samples with no surface treatment (cubic test sample of code A, cylindrical test sample of Code G) are noticeably abraded. In addition, it is proved that the abrasion of the cylindrical test samples was great in the combination of Alumites only. From the comparison of the amounts abraded in both the cylindrical test samples and the cubic test samples, it is also found that the combination of an Alumite material and an Fe-series plate material (D,E,F) in Embodiments 1 to 3 were more superior than the combination (C) of an Alumite material and a quenched steel, although the base material in the former three cases was an aluminum alloy.

Figure 2:
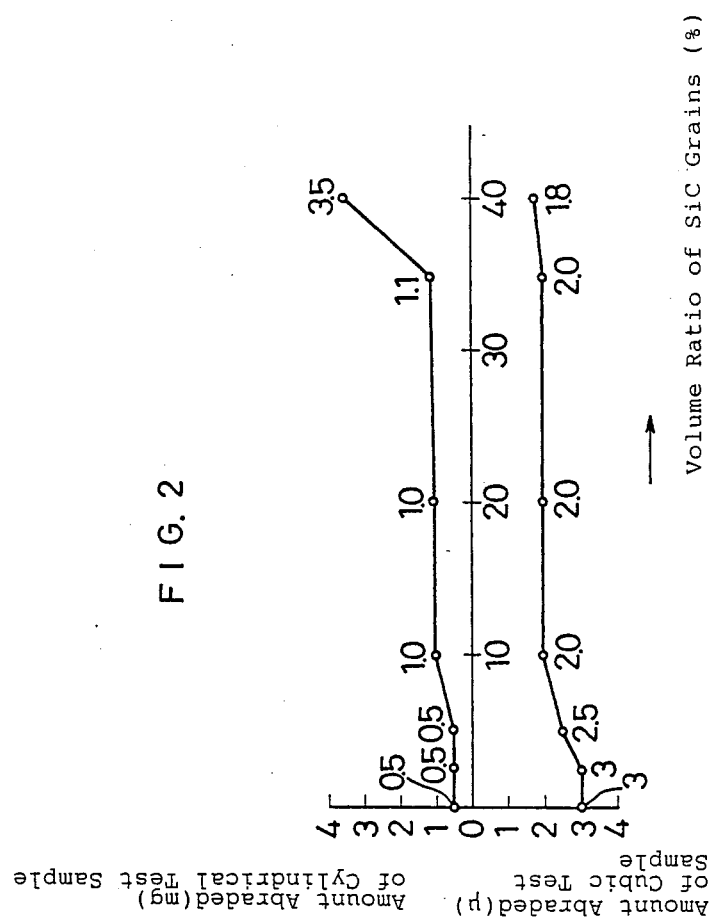
FIG. 2 is a graph showing the relation between the volume ratio of the SiC grains in the Fe-plating layer of the slide parts of another embodiment of the present invention and the abrasion-resistance thereof.

Embodiment 4:

In the case of the combination Code F in Table 1, the amount of the SiC grains to be dispersed in the Fe-plate layer was varied so as to analyze the influence of the variations on the degree of the abrasion. For this purpose, various kinds of test samples prepared in Embodiment 3 were subjected to the above described abrasion test. The results obtained are shown in FIG. 2.

From these results, it is shown that the abrasion of the Fe-plate layer is greater with a reduction in the volume ratio of the SiC grains in the plate layer, and as the volume ratio of SiC grains is increased, the plate layer abrades more the other slide part which is in contact therewith.

Embodiments 5 to 7:

Using the similarly combined parts of Codes D, E and F in Table 1 above, combinations of cylindrical test samples, each having an outer diameter of 25.4 mm, an inner diameter of 20 mm, and a length of 10 mm were manufactured as Embodiments 5, 6 and 7, and these were subjected to a baking test, as mentioned below.

Examples 8 to 14:

Using the similarly combined parts of Codes A, B, C, G, H, I and J in Table 1, combinations of cylindrical test samples, each having an outer diameter of 25.4 mm, an inner diameter of 20 mm, and a length of 10 mm were manufactured as Examples 8, 9, 10, 11, 12, 13 and 14, and these were subjected to the same baking test as in Embodiments 4 to 6.

Each of the cylindrical test sample combinations of Embodiments 5 to 7 and Examples 8 to 14 was set in such a manner that the edge surface of one cylinder sample was kept in contact with that of the other cylinder sample, and subjected to a baking test for measuring the load limit of baking under the condition of a rotation number of 1000 rpm and a press load varying stepwise from 10 kg to 700 kg, while a lubricant oil (trade name "Castle Motor Oil" 5W-30) was applied thereto. The results obtained are shown in Table 2.

TABLE 2

| No. | Code | Load limit of Baking (kg) |
|---|---|---|
| Example 8 | A | 200 |
| Example 9 | B | 200 |
| Example 10 | C | 400 |
| Embodiment 5 | D | 450 |
| Embodiment 6 | E | 500 |
| Embodiment 7 | F | 450 |
| Example 11 | G | 250 |
| Example 12 | H | 375 |
| Example 13 | I | 375 |
| Example 14 | J | 350 |

As seen from Table 2, it was confirmed that the test examples of Embodiments 5 to 7 of the present invention had a superior baking-resistance than the test samples of Examples 8 to 14.

Embodiments 8 to 10 and Examples 15 and 16

Figure 3:
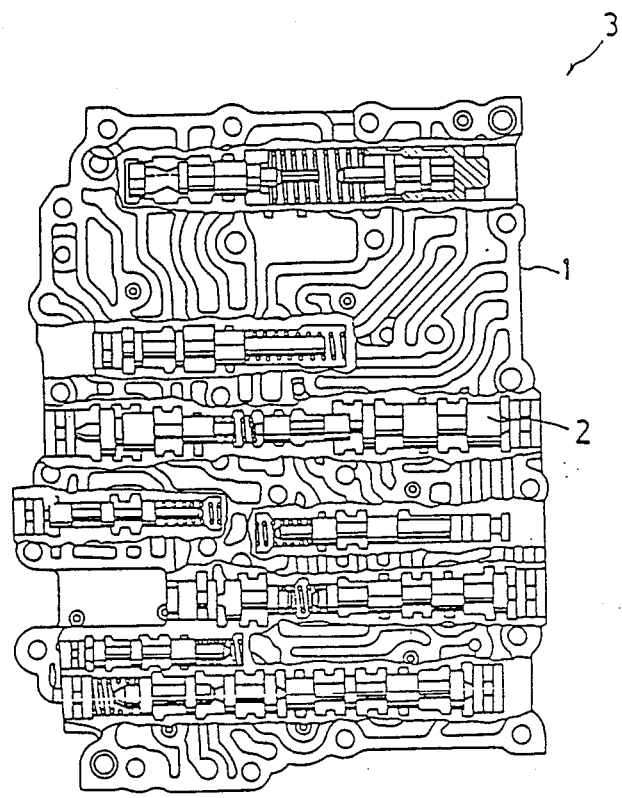
FIG. 3 is a view showing the structure of the reciprocating slide parts of an oil path line valve device to be used in a automatic transmission.

FIG. 3 shows an oil pressure valve device (3) which is incorporated in an automatic transmission. The valve body (1) was manufactured by using an aluminum alloy (JIS, ADC 10), which was Alumite-coated. The shift valve (2) was formed of the same material as each of the five cubic test samples (B,C,D,E and F) as shown in Table 1. The oil pressure valve (2) and the abovementioned body (1) were combined to form the oil pressure valve device (3); and this was actually placed into the transmission of a car, and subjected to a durability test to check for damage after a 90,000 cycle running (100 hours running) of the valve. The outer diameter of the valve was 10 mm, and the clearance between the valve and the body was 40 μm.

The results obtained were summarized and shown in Table 3. In the case of the combination of the Alumite material and the quenched steel (Code C), the valve does not work after 40,000 cycles because of sticking. In the case of the two Alumite materials (Code B), the abrasion of both the body and the valve was great, although no sticking occurred. As compared with the above two examples, the cases of the combinations, each comprising an Alumite material and a Fe-series plated material (Codes D, E and F, in Embodiments 8, 9 and 10 respectively) were found satisfactorily as shown in the results of Table 3.

TABLE 3

| | | Durability Test Results | | |
| | | Amount abraded (in μm) | | |
| No. | Code | Valve | Body | Sticking |
|---|---|---|---|---|
| Example 15 | B | 15 | 4 | none |
| Example 16 | C | — | — | appeared |
| Embodiment 8 | D | 3 | 0.5 | none |
| Embodiment 9 | E | 2.5 | 1.2 | " |
| Embodiment 10 | F | 4 | 0.5 | " |

Effect of the Invention

The slide parts of the present invention have extremely strong properties as compared with the slide parts made in combination with the conventional aluminum alloy, wherein the former have a higher baking-resistance than the latter by 2 times and a higher abrasion-resistance than the latter by 6 to 20 times.

The slide parts of the present invention can be used as reciprocating slide parts, which are to be placed under severe sliding conditions. When the slide parts of the present invention are used for reciprocating motion, the clearance variations caused by thermal expansion is minor, and therefore sticking does not occur as the base metal is an aluminum alloy in both parts.

Furthermore, the slide parts of the present invention have greater abrasion-resistance and baking-resistance than the slide parts comprising a combination of an aluminum alloy and a steel material. Therefore, the former may be used in place of the latter. Thus, the present invention has significant industrial merits by providing lightweight abrasion-resistant slide parts.

What is claimed is:

1. Slide parts each having a slide surface and comprising one part made of an aluminum alloy having an Alumite layer on the slide surface thereof and the other part made of an aluminum alloy having a Fe-series wet-plated layer on the slide surface thereof, said slide surfaces for providing mutual contact for relative sliding movement.

2. Slide parts as defined in claim 1, wherein said Fe-series wet-plated layer is selected from the group consisting of a Fe-plated layer, a SiC grains-dispersed Fe-plated layer and a Fe-0.2–15% P-plated layer.

3. Slide parts as defined in claim 2, wherein the SiC grains-dispersed Fe-plated layer contains SiC grains with a grain size of from 0.1 to 10μ, dispersed in an amount of from 5 to 35% by volume.

4. Slide parts as defined in claim 1, wherein one of the parts is a body of an oil pressure valve device of an automatic transmission, and the other parts is a valve to slide on said body.

5. Slide parts as defined in claim 1, wherein the difference in the thermal expansion coefficient between the aluminum alloy of the one part and the aluminum alloy of the other part is $3 \times 10^{-6}$/°C. or less.

* * * * *